United States Patent
Mehner et al.

(10) Patent No.: US 7,498,561 B2
(45) Date of Patent: Mar. 3, 2009

(54) ARRANGEMENT FOR THE DETECTION OF ILLUMINATION RADIATION IN A LASER SCANNING MICROSCOPE

(75) Inventors: Thomas Mehner, Kleinromstedt (DE); Stefan Wilhelm, Jena (DE); Ulrich Meisel, Jena (DE); Mirko Liedtke, Jena (DE)

(73) Assignee: Carl Zeiss MicroImaging GmbH, Jena (DE)

( * ) Notice: Subject to any disclaimer, the term of this patent is extended or adjusted under 35 U.S.C. 154(b) by 0 days.

(21) Appl. No.: 11/487,936

(22) Filed: Jul. 17, 2006

(65) Prior Publication Data

US 2006/0255237 A1 Nov. 16, 2006

Related U.S. Application Data

(62) Division of application No. 10/888,260, filed on Jul. 9, 2004, now abandoned.

(30) Foreign Application Priority Data

Jul. 11, 2003 (DE) ................................. 103 32 064

(51) Int. Cl.
 *G01J 3/50* (2006.01)
(52) U.S. Cl. ........................ 250/226; 250/225; 324/752; 324/753; 356/368
(58) Field of Classification Search .............. 250/201.3, 250/225–226, 234, 311; 356/287, 368; 324/752–753
See application file for complete search history.

(56) References Cited

U.S. PATENT DOCUMENTS

| 6,167,173 A * | 12/2000 | Schoeppe et al. ............. 385/33 |
| 6,356,088 B1 * | 3/2002 | Simon et al. ................. 324/752 |
| 6,521,899 B1 | 2/2003 | Wolleschensky |
| 7,187,493 B2 * | 3/2007 | Sasaki et al. ................. 359/381 |
| 2002/0050564 A1 | 5/2002 | Birk et al. |

FOREIGN PATENT DOCUMENTS

| DE | 197 02 753 | 7/1998 |
| DE | 198 27 140 | 12/1999 |
| DE | 198 35 072 | 2/2000 |
| EP | 1 115 021 | 7/2001 |

OTHER PUBLICATIONS

XP-001090819 Journal of Microscopy, vol. 117, Part 2, Nov. 1979, pp. 233-242 "Imaging modes in confocal scanning light microscopy (CSLM)" G. J. Brakenhoff.

* cited by examiner

*Primary Examiner*—Stephen Yam
(74) *Attorney, Agent, or Firm*—Reed Smith LLP

(57) ABSTRACT

An arrangement for the detection of the illumination radiation in a laser scanning microscope, wherein a portion of the illumination radiation is coupled out and detected at the main color splitter, wherein light transmitted through the main color splitter is advantageously detected and/or a portion of the illumination radiation is coupled out and detected before coupling into a light-conducting fiber and/or a portion of the illumination radiation is coupled out and detected at a beam splitter arranged downstream of a light-conducting fiber.

3 Claims, 1 Drawing Sheet

ARRANGEMENT FOR THE DETECTION OF ILLUMINATION RADIATION IN A LASER SCANNING MICROSCOPE

CROSS-REFERENCE TO RELATED APPLICATION

This application is a divisional of U.S. patent application Ser. No. 10/888,260, filed on Jul. 9, 2004, now abandoned, which claims priority of German Application No. 103 32 064.4, filed Jul. 11, 2008, the complete disclosures of which are hereby incorporated by reference.

BACKGROUND OF THE INVENTION a) Field of the Invention

The invention relates to an arrangement for the detection of illumination radiation in a laser scanning microscope.

b) Description of the Related Art In DE 197 02 753, a portion of the excitation output is deflected to a monitor diode in a laser scanning microscope in the excitation beam path in front of the main color splitter by means of an additional reflecting arrangement.

The arrangement for reflection onto the monitor diode can accordingly be arranged in the beam path in such a way that the laser light strikes the coating or layer in a p-polarized manner while the main color splitter is struck with s-polarization.

The light exiting from the light-conducting fiber is linearly polarized at better than 100:1. This is achieved by stress-induced birefringence. In a corresponding manner, the linearly polarized laser light can be guided in the fiber in two axes perpendicular to one another. Derived from this degree of polarization, the electric field strength vector has an x-component and a y-component (s-pole and p-pole) with an intensity ratio of 100:1. In order to achieve this degree of polarization at the fiber output, it is necessary to couple in the linearly polarized laser light parallel to one of the birefringent axes of the fiber. The orientation of the birefringent axes can vary by fractions of angular degrees relative to the polarization direction of the laser due to environmental influences. The portion of laser light that is coupled into the respective axes can vary in a corresponding manner. With respect to the polarization at the fiber output, this means that the intensity ratio between the x- and y-components of the electrical field strength vector varies. The dichroic layers used for the beam deflection in the illumination beam path of the LSM preferentially reflect one of the two components of the field strength vector (e.g., the x-component). When a monitor diode is arranged in such a way that, in contrast to the illumination beam path, the y-component is preferentially reflected in the path in which the monitor diode is positioned, there are different intensity variations in the two beam paths.

Further, a loss in illumination energy results from the additional element for reflecting onto the monitor diode.

OBJECT AND SUMMARY OF THE INVENTION

It is the object of the invention to obtain a comparison signal for the excitation radiation which is correlated to the detector signal in the most optimal manner possible.

This object is met in an arrangement for the detection of the illumination radiation in a laser scanning microscope comprising that a portion of the illumination radiation is coupled out and detected at the main color splitter.

BRIEF DESCRIPTION OF THE DRAWINGS

The invention will be described more fully with reference to a schematic drawing in FIG. 1. In this connection, reference is had to the description of a LSM beam path in DE 197 02 753 A1.

DESCRIPTION OF THE PREFERRED EMBODIMENTS

Figure 1:
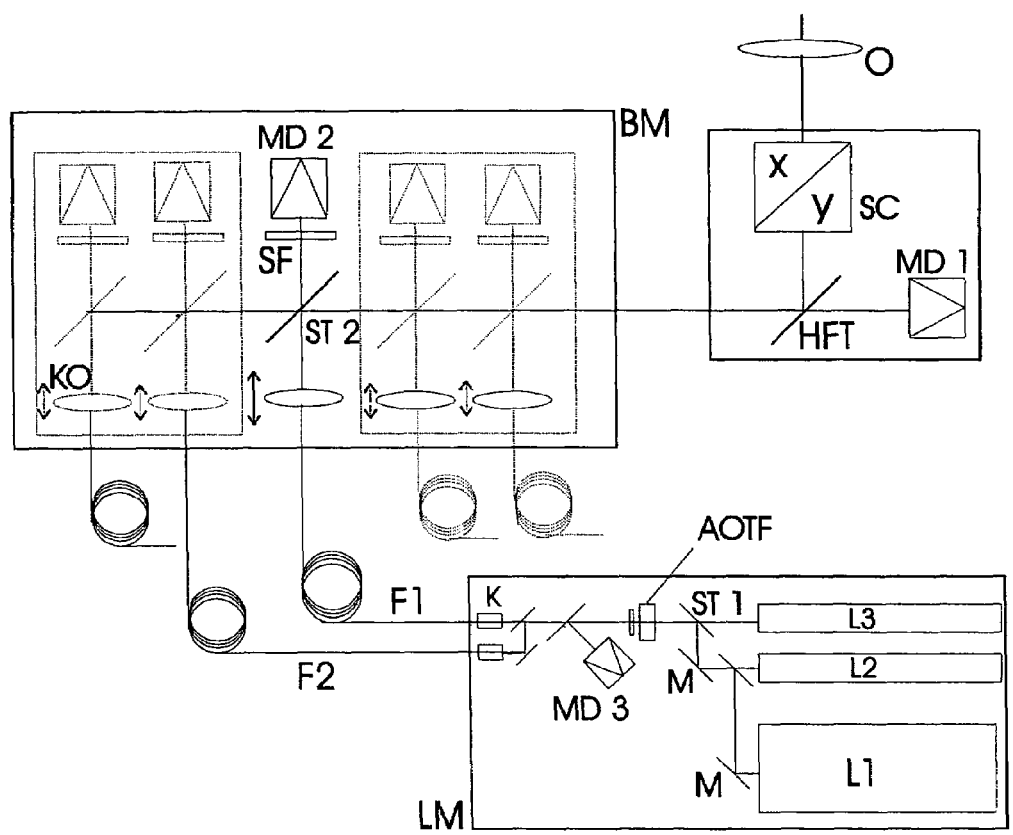

A laser module LM contains a plurality of lasers L1-L3 which are combined or unified by means of beam splitters ST1 and are coupled into a light-conducting fiber F1 by an AOTF and a coupling location K.

Alternatively, coupling can also be carried out in another lightguide F2 by means of another beam splitter.

Displaceable collimating optics KO are provided in the illumination module BM. The laser light travels in the direction of the main color splitter HFT of the microscope by means of these displaceable collimating optics KO and beam splitters ST2 and in the direction of the sample, not shown, via an X/Y scanner SC and an objective O. The detection beam path perpendicular to the illumination beam path is not shown.

According to the invention, the positioning of a monitor diode is carried out, alternatively or simultaneously, in a plurality of advantageous arrangements:

A: In the illumination direction behind the main color splitter HFT. The laser light impinging on a monitor diode MD1 through HFT corresponds to the proportion not reflected by the HFT. The advantage is that no additional optical element is required for directing laser light to the monitor diode MD1. Accordingly, light with identical polarization is present in the beam path of the monitor diode as well as in the excitation beam path. Further, a neutral splitter 80/20 or another splitting ratio which transmits greater than 50% (or 80% in case of the 80/20 splitter) of the incident energy which accordingly reaches the main splitter is selectively used as main color splitter HFT during the measurement.

Due to the high proportion of transmitted output, the transmitted output is to a great extent independent from changes in transmission caused by the effects of temperature (single layer construction). Further, in this way, the proportion of illumination energy reaching the monitor diode is subject to the same variations as the laser light reflected to the sample. A wavelength can be measured at any time.

B: In the illumination module BM behind the beam splitter ST2, associated with the respective laser port, as is illustrated by way of example by the monitor diode MD2. This has the advantage that a parallel measurement of a wavelength can be carried out from every laser port. It is ensured by means of additional blocking filters SF that every monitor diode detects only light from the laser port associated with it.

C: On the laser module LM, for example, behind the AOTF and in front of the fiber coupling, advantageously by means of reflection at an uncoated glass plate GL onto a monitor diode MD3. In this way, it is possible to measure the laser output in front of the fiber coupling.

The following measurement modes are advantageously possible for the different arrangements:

I. The monitor diode signal is continuously read out (preset electronics). This means that averaging takes place over a determined time window. Since the AOTF is controlled differently (e.g., the excitation output is switched off during a return scan) depending on the scanning program (unidirectional, bidirectional, ROI), a mode in which the AOTF is constantly switched on must be set for measuring the monitor diode signal. This ensures that the signal measured at the monitor diode is not dependent upon the scanning program. A measuring process accordingly comprises the following steps:
   a) the scanning process is stopped
   b) neutral splitter 80/20 is moved in
   c) AOTF is switched to continuous mode; only the laser line to be measured is activated.
   Uses in applications:
   a) When a deviation from a reference value/previous measured value is determined, the excitation output can be corrected by adjusting the AOTF. (Amplitude of the acoustic wave)
   b) In connection with the REUSE function (adjustment of receiving parameters of a stored image) of the software and in connection with a calibration of the monitor diode, the laser output for every laser line in the experiment can be adjusted in an exactly reproducible manner.
   II. It is also conceivable to read out the monitor diode signal synchronous with the scanning process and control of the AOTF. A readout would then be possible during the scanning process and a permanent control of the excitation output can be realized.

In order to carry out a measurement of individual lines in this case in an experiment with a plurality of excitation laser lines, a filter wheel with line selection filters can be arranged in front of the monitor diode. This enables constant recording of the intensity of the individual lines for a wavelength or a wavelength region.

A spectral splitting of the collinearly superimposed laser radiation of a plurality of laser light sources in the beam path in front of the monitor diode and spectrally selective detection are also possible.

In order to realize a construction which is as compact as possible and requires the least space, the monitor diode is adapted to the light output of the respective laser line by adapting the amplification (logarithmic amplification/damping) to the subsequent electronics.

The arrangements according to the invention can advantageously be used for:
   1. Stabilization/recording of the excitation output in long-term experiments (arrangements A and B)
   2. Quantitative measurement of the excitation output (power meter function) (arrangements A and B)
   3. Error search for servicing (coupling efficiency of light-conducting fiber) (arrangements A, B and C)
   4. Automatic fiber alignment by two monitor diodes (arrangements A, B and C)

Additional clarification with respect to items 3 and 4: In connection with the monitor diode on the laser module and in comparison of the two monitor diode signals (laser module/illumination module), it is possible to distinguish between variations in laser output (long-term measurement) and misaligned or defective fiber coupling (short-term measurement). This makes possible a remote diagnosis by means of the remote capability of the system and, accordingly, an efficient elimination of errors. Items 3 and 4 make use of the presence of monitor diodes behind the light-conducting fibers. This makes it possible, for example, to check the quality of the fiber input-coupling and can be used in connection with a mechanization of the adjusting elements of the fiber coupling for an automatic adjustment of the fiber coupling.

While the foregoing description and drawings represent the present invention, it will be obvious to those skilled in the art that various changes may be made therein without departing from the true spirit and scope of the present invention.

The invention claimed is:

1. An arrangement for the detection of the illumination radiation in a laser scanning microscope, comprising:
   a laser module having a plurality of laser sources;
   an illumination module coupled to the laser module by a plurality of light-conducting fibers, said illumination module having displaceable collimating optics and beam splitters, each beam splitter being associated with a respective optical fiber;
   a main color splitter;
   a number of monitoring diodes corresponding to the number of beam splitters, each monitoring diode being positioned behind a respective beam splitter in illumination direction,
   each beam splitter, other than the main color splitter, reflecting illumination radiation coming from the respective optical fiber to the main color splitter and also permitting pass through illumination radiation coming from the respective optical fiber to the respective monitoring diode;
   said beam splitters and monitoring diodes are arranged in such a way that the illumination radiation directed to the monitoring diodes has the same polarization direction as the illumination directed to the sample by the main color splitter;
   wherein the illumination module is positioned so that the beam splitters direct the illumination radiation from the collimating optics to the main color splitter and monitoring diodes,
   wherein the monitoring diodes detect different wavelengths of the illumination radiation.

2. The arrangement according to claim 1, wherein light transmitted through an input-coupling splitter is detected.

3. The arrangement according to claim 1, wherein the illumination module further comprises a plurality monitoring diodes, wherein each one of the plurality of monitoring diodes monitors the wavelength of the illumination radiation received from a respective laser port.

* * * * *